(12) United States Patent
Shan et al.

(10) Patent No.: US 10,770,244 B2
(45) Date of Patent: Sep. 8, 2020

(54) CONTROL MODULAR ASSEMBLY AND SWITCH INCLUDING THE SAME

(71) Applicant: SCHNEIDER ELECTRIC (AUSTRALIA) PTY LTD, Macquarie Park (AU)

(72) Inventors: Fuhua Shan, Shenzhen (CN); Zhen Ma, Shenzhen (CN)

(73) Assignee: Schneider Electric (Australia) Pty Ltd, Macquarie Park (AU)

( * ) Notice: Subject to any disclaimer, the term of this patent is extended or adjusted under 35 U.S.C. 154(b) by 0 days.

(21) Appl. No.: 16/368,955

(22) Filed: Mar. 29, 2019

(65) Prior Publication Data

US 2019/0333724 A1 Oct. 31, 2019

(30) Foreign Application Priority Data

Mar. 30, 2018 (CN) ..................... 2018 2 0493211 U

(51) Int. Cl.
*H01H 13/58* (2006.01)
(52) U.S. Cl.
CPC .................................. *H01H 13/58* (2013.01)
(58) Field of Classification Search
CPC ........ H01H 13/58; H01H 19/62; H01C 10/32; H05B 37/02
USPC ...... 200/18, 527, 329–332.1, 339, 553, 554, 200/557, 559; 315/293, 362
See application file for complete search history.

(56) References Cited

U.S. PATENT DOCUMENTS 4,654,626 A * 3/1987 Carsello ................. H01C 10/14
338/172

| 5,465,031 A | * | 11/1995 | Nilssen | ................. | H05B 47/16 |
| | | | | | 315/362 |
| 5,955,796 A | | 9/1999 | Nilssen | | |
| 7,009,111 B1 | * | 3/2006 | Rintz | ...................... | H01H 9/18 |
| | | | | | 174/66 |
| 2009/0218205 A1 | | 9/2009 | Blakeman | | |

(Continued)

FOREIGN PATENT DOCUMENTS

GB 2537805 11/2016

OTHER PUBLICATIONS

Combined Search and Examination Report for United Kingdom Patent Application No. GB19043132 dated Sep. 23, 2019, 8 pages.

*Primary Examiner* — Nguyen Tran
*Assistant Examiner* — Iman Malakooti
(74) *Attorney, Agent, or Firm* — Locke Lord LLP

(57) ABSTRACT

Embodiments of the present disclosure provide a control modular assembly (130) for a switch, wherein the control modular assembly comprises: a driving mechanism comprising an output shaft (122); a control unit coupled to the driving mechanism and configured to receive and process a signal for controlling the switch so as to control a movement of the output shaft (122) of the driving mechanism; and an operating member coupled to the output shaft (122); wherein the control modular assembly (130) is detachably coupled to an internal functional assembly (160) of the switch, so that the operating member can be driven by the output shaft (122) to move within a given movement range in response to the signal for controlling the switch, such that the operating state of the switch is controlled by controlling the internal functional assembly (160). Embodiments of the present disclosure further provide a switch (300) comprising the control modular assembly (130).

13 Claims, 7 Drawing Sheets

(56) References Cited

U.S. PATENT DOCUMENTS

2009/0288937 A1 11/2009 Agronin et al.
2015/0228426 A1 8/2015 Romano et al.
2016/0196938 A1 7/2016 Bailey et al.

* cited by examiner

CONTROL MODULAR ASSEMBLY AND SWITCH INCLUDING THE SAME

FIELD

Embodiments of the present disclosure relate to an electric switch assembly, and more specifically to a wall electric switch assembly.

BACKGROUND

Panel switches, such as sockets and universal electric sockets with switch assemblies, are necessary for home decoration. In the panel switch assembly industry, there are thousands of products of different shapes and styles, such as large panel switches, square switches and circular switches. Moreover, there are different types of switches, such as rocker switches, push button switches, and the like. Current panel switches typically have panel assemblies and functional assemblies, both of which are generally integrated for sale and installation, and panel assemblies and functional assemblies cannot be individually removed or replaced.

Currently, there are a wide variety of switches available in the market, without any associations between various switch types. Once a switch assembly of a particular type and appearance is installed, the user must replace the original switch assembly with a brand new switch assembly if he/she wants to change the appearance or type of the switch assembly. As a result, updating a component of the switch assembly means updating the entire switch assembly. This is undoubtedly undesired for those users who only need to change the type or appearance of the switch assembly.

In addition, it is possible that users contact with high voltage components during the installing and disassembling processes of the switch. As a result, such processes must be operated by a professional or certified person, such as an electrician, to ensure safety. This can be expensive and time-consuming for the users who want to change the type or appearance of the switch.

Specifically, for electronic switches, there are two different types of panel products, namely, mechanical switches and electronic switches, for which the wirings and types of loads are very different. Therefore, these two kinds of switches very much differ from one another especially in terms of installation. Accordingly, it is now infeasible to interchange between the electronic switch panel and the mechanical switch panel.

For the reasons stated above, conventional products as mentioned above cannot meet the increasing requirements for personalization of customers and environmental protection.

SUMMARY

Embodiments of the present disclosure provide a control modular assembly and a switch comprising the same to solve the above problems.

In a first aspect, embodiments of the present disclosure provide a control modular assembly for a switch. The control modular assembly comprises: a driving mechanism having an output shaft; a control unit coupled to the driving mechanism and configured to receive and process a signal for controlling the switch so as to control the movement of the output shaft of the driving mechanism; and an operating member coupled to the output shaft; wherein the control modular assembly is detachably coupled to an internal functional assembly of the switch, so that the operating member can be driven by the output shaft to move within a given movement range in response to the signal for controlling the switch, such that the operating state of the switch is controlled by controlling the internal functional assembly.

In some embodiments, the control modular assembly further comprises a transmission mechanism, the transmission mechanism comprises a driving element and a driven element engaged with each other, wherein the driving element is coupled to and driven by the output shaft, the driven element is coupled to the operating member to drive the operating member to move within a given movement range.

In some embodiments, the driving element and the driven element are gears, and wherein the driven element is integrated with the operating member, and wherein a rotation axis of the driven element coincides with a rotation axis of the operating member.

In some embodiments, the driving element is a gear and the driven element is a rack, and wherein the operating member is arranged on a side of the rack without teeth to enable a translational movement of the driven element to drive the operating member to rotate around a rotation axis within the given movement range.

In some embodiments, the operating member comprises two contact arms, the two contact arms are provided with at least one protrusion on opposite inner surfaces. Preferably, the two contact arms incline to each other in a tapered manner so as to provide a clamping force.

In some embodiments, the operating state of the switch comprises a circuit-on state, a circuit-off state and a current adjustment state.

In some embodiments, the driving mechanism is a motor, and wherein the control modular assembly further comprises a power source for supplying power to the motor.

In some embodiments, the power source is a rechargeable battery, and wherein the control modular assembly further comprises a charging port for charging the battery. Alternatively, the power source is a power-obtained device for obtaining power from the switch to supply power to the motor.

In some embodiments, the control unit comprises a signal receiving sensor for receiving the signal for controlling the switch.

In a second aspect, embodiments of the present disclosure provide a switch. The switch comprises the control modular assembly as described above; and an internal functional assembly operable to control an operating state of the switch; wherein the control modular assembly is detachably coupled to the internal functional assembly of the switch, so that the operating member of the control modular assembly can be driven by the output shaft of the driving mechanism to move within a given movement range in response to the signal for controlling the switch, such that the operating state of the switch is controlled by controlling the internal functional assembly.

In some embodiments, the switch further comprises a panel coupled to a control unit of the control modular assembly and operable to input the signal for controlling the switch.

In some embodiments, the switch further comprises a base plate coupled to the internal functional assembly and comprising a through aperture, and wherein the operating member passes through the through aperture to be coupled with the internal functional assembly.

In some embodiments, the internal functional assembly comprises: a swinging member arranged to abut against the operating member to be driven by the operating member; a contact rod adapted to control the operating state of the switch by changing a position; and a spring arranged between the swinging member and the contact rod and adapted to provide a pressure to the swinging member and the contact rod, thereby adjusting the position of the contact rod in response to a movement of the swinging member.

According to embodiments of the present disclosure, when it is necessary to change the type or appearance of the switch assembly, it is possible to change the modular panel assembly without changing the functional assembly, and changing the modular panel assembly does not resort to a professional.

Embodiments of the present disclosure particularly enable the interchangeability of an electronic panel assembly with a mechanical panel assembly (e.g., a rocker panel assembly, a push button panel assembly, etc.) in the same mechanical switch functional platform, such that the user does not need to purchase another switch functional platform specially for the electronic switch panel assembly. Instead, it is able to arbitrarily exchange the electronic switch panel assembly and the mechanical switch panel assembly in the installed mechanical switch functional platform.

As a result, the consumer's expenses are reduced and thus a pleasant purchase and use experience are provided to the consumer. Further, the manufacturing cost of the switch products are greatly reduced, which contributes to environmental protection.

BRIEF DESCRIPTION OF THE DRAWINGS

The above and other objects, features and advantages of the embodiments of the present disclosure will become more apparent through the following detailed description with reference to figures which are drawn not necessarily in a scale. In the figures, embodiments of the present disclosure are described in an exemplary and non-restrictive manner, in which.

DETAILED DESCRIPTION

Figure 1:
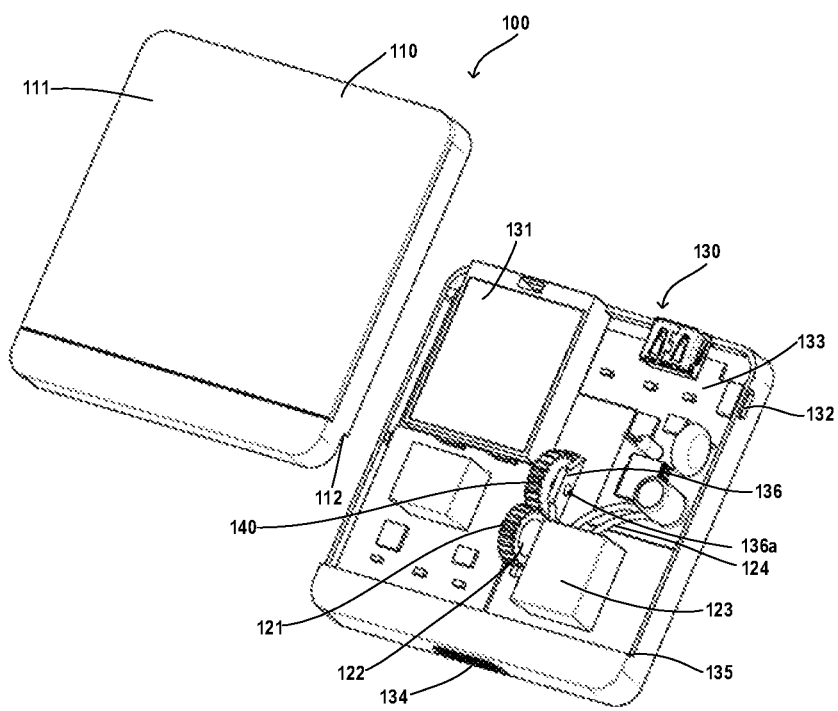
FIG. 1 illustrates an exploded view of a modular panel assembly according to an exemplary embodiment of the present disclosure.

The principles of the present disclosure will be described with reference to various exemplary embodiments illustrated in the drawings. When describing embodiments or examples in conjunction with the drawings, the directional terminologies, such as "upper", "lower", "vertical", "horizontal (transverse)", "clockwise", "counterclockwise", etc., are used to facilitate a description of the present disclosure, either based on the direction in which the reader views the drawings, or based on the direction of the product being used normally. These directional terminologies would not undesirably limit the protection scope of the present disclosure.

Figure 2A:
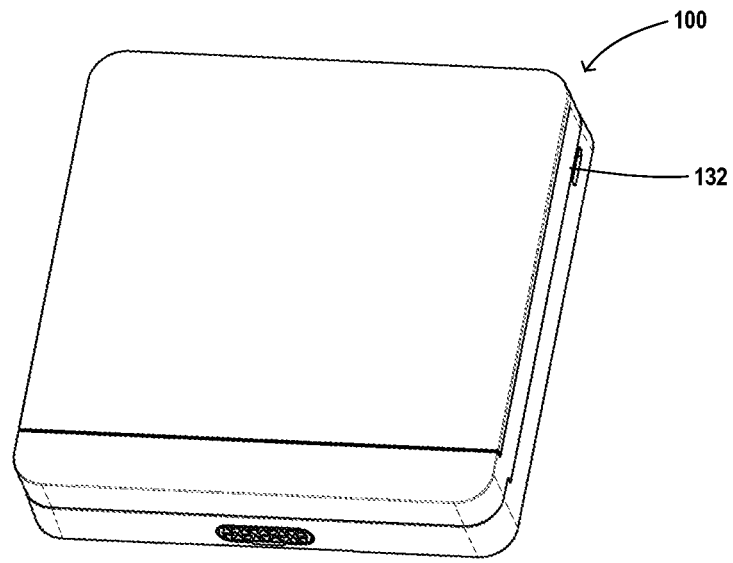
FIGS. 2a and 2b respectively illustrate front and back sides of the modular panel assembly in FIG. 1.
Figure 2B:
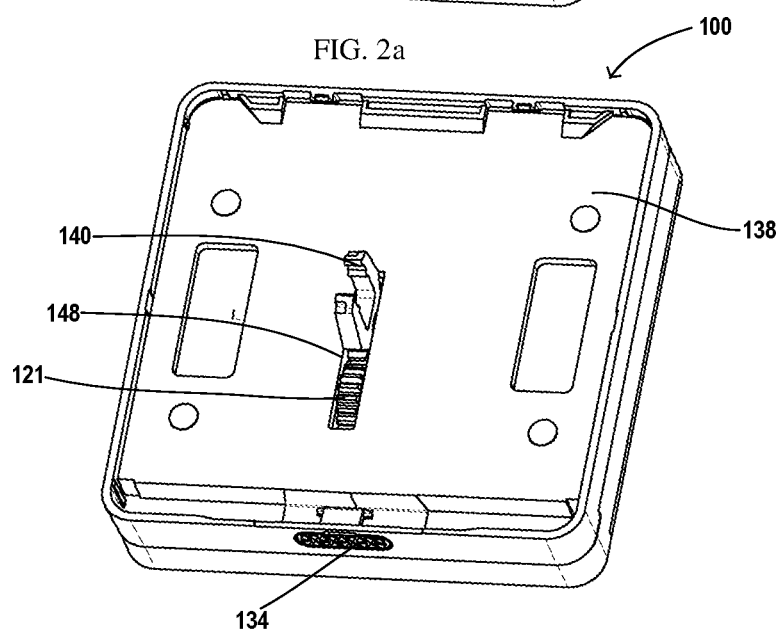
Figure 3:
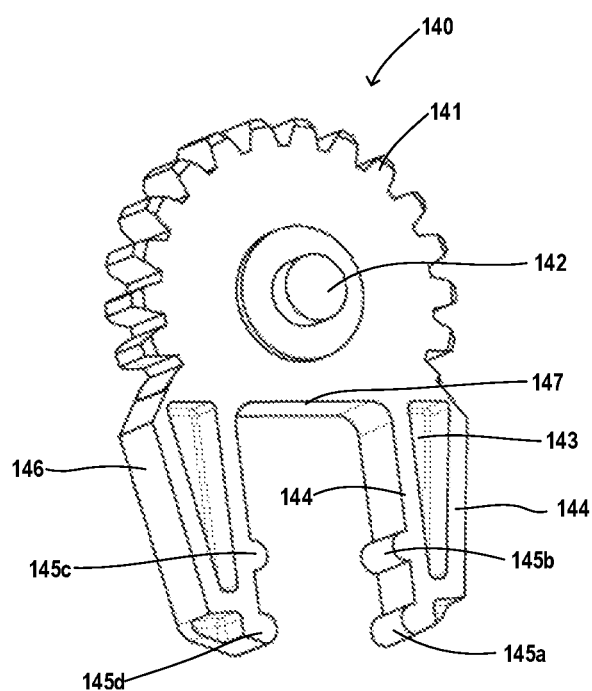
FIG. 3 illustrates an enlarged schematic view of an exemplary driven element of the modular panel assembly according to an exemplary embodiment of the present disclosure.

A modular panel assembly 100 in accordance with an exemplary embodiment of the present disclosure will be described in detail below in conjunction with FIGS. 1, 2a-2b, and 3. FIG. 1 illustrates an exploded view of a modular panel assembly according to an exemplary embodiment of the present disclosure. FIGS. 2a and 2b respectively illustrate front and back sides of the modular panel assembly in FIG. 1. FIG. 3 illustrates an enlarged schematic view of an exemplary driven element of the modular panel assembly according to an exemplary embodiment of the present disclosure.

Referring to FIG. 1, the modular panel assembly 100 comprises a panel 110 and a control modular assembly 130. The control modular assembly 130 comprises a driving mechanism, a control unit and an operating member. The driving mechanism has an output shaft 122. In some embodiments, the driving mechanism can be implemented in the form of a hydropress or a motor. The control unit is coupled to the driving mechanism and is capable of receiving and processing a signal for controlling a switch so as to control the movement of the output shaft of the driving mechanism. The operating member is coupled to the output shaft 122.

Unlike a control modular assembly of a conventional switch, the control modular assembly 130 according to embodiments of the present disclosure can be detachably coupled to an internal functional assembly 160 of the switch, so that the operating member can be driven by the output shaft 122 to move in a given range in response to the signal for controlling the switch. In this way, the operating state of the switch can be controlled by controlling the internal functional assembly 160.

The control modular assembly is detachably connected to the internal functional assembly 160 such that the type or appearance of the switch can be changed without changing the internal functional assembly of the switch.

In some embodiments, as illustrated in FIG. 1, the control modular assembly 130 further comprises a motor 123, a printed circuit board assembly (PCBA) 133 electrically connected to the motor 123 via a wire 124, a transmission mechanism 121 connected to the output shaft 122 of the motor 123 for transmitting power, and a battery 131 for supplying electric energy to the motor 123.

In some embodiments, the control unit can be a part of the control modular assembly 130. For example, the control unit can be arranged on the PCBA 133. Alternatively, the control unit can also be arranged at any other suitable locations outside of the PCBA 133. In addition, an information receiving sensor and a motor controller can be integrated on the PCBA 133. Alternatively, the information receiving sensor and/or the motor controller can be separate from the PCBA 133, for example, arranged outside of the switch 300.

As illustrated in FIG. 1, the transmission mechanism 121 comprises a driving element, for example, in the form of a gear. The transmission mechanism 121 further comprises a driven element 140. In other words, in this embodiment, the transmission mechanism 121 is in the form of a transmission pair. The driving element of the transmission pair is fixedly and directly coupled to the output shaft 122 of the motor 123. The driven element 140 of the transmission pair is linked to the driving element.

In some embodiments, the transmission pair can be a pair of gears meshed with each other. In this case, the driving element (for example in a form of a driving wheel) is fixedly and directly coupled to the output shaft 122 of the motor 123, and the driven element 140 (for example in a form of a driven wheel) is linked with the driving wheel through meshing. These two gears meshed with each other are, for example, spur gears or helical gears. When the gears are helical gears, noise generated during the power transmission can be further reduced, thereby making users who concern the level of noise in the room (for example, patients in hospitals, etc.) feel calm and peaceful.

The driven element 140 of the transmission mechanism 121 is mounted on a support structure 136. The support structure 136 can be integrally formed with the main body of the control modular assembly 130 via a suitable process such as an injection molding. An aperture 136a is formed on the support structure 136 for receiving a shaft 142 (FIG. 3) formed on an outer surface of the driven element 140. The driven element 140 and the support structure 136 can be connected with each other in any other manner for facilitating the linkage of the driven element 140 with the driving element of the transmission mechanism 121.

In some embodiments, the operating member can be integrated on the driven element 140 and at least partially pass through the control modular assembly via an opening 148 (FIG. 2b) formed in the control modular assembly 130. The rotation axes of the driven element 140 and the operating member can coincide with each other.

Figure 7:
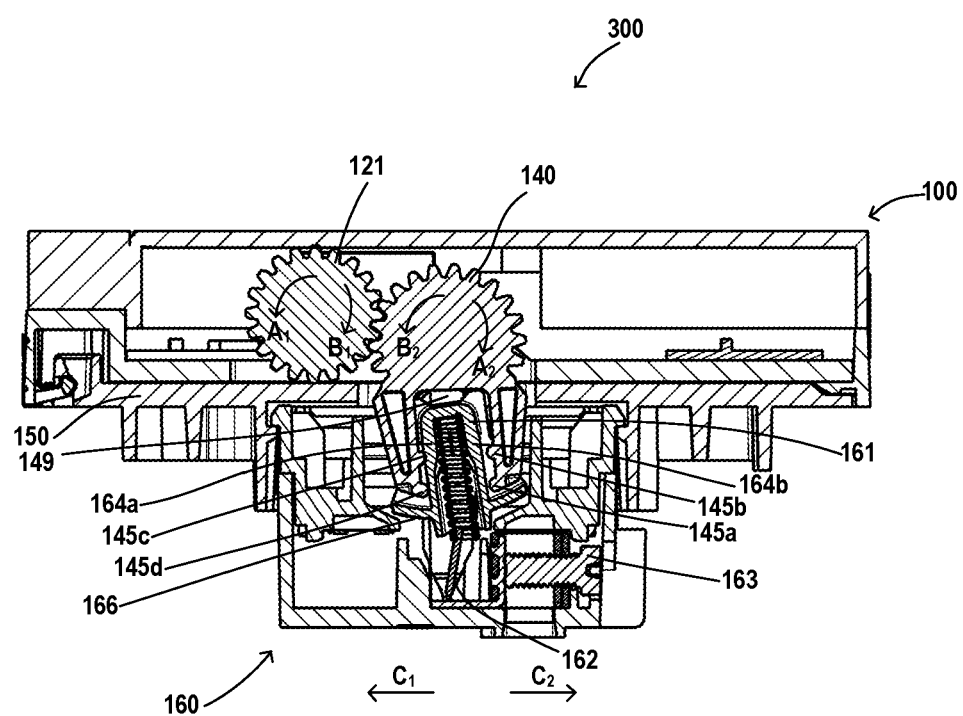
FIG. 7 illustrates a cross-sectional view of a switch comprising a modular panel assembly and a mechanical switch functional platform according to an exemplary embodiment of the present disclosure.

In some embodiments, the driven element 140 can be integrally formed with the operating member, for example, by an injection molding process. The driven element 140 may be in the form of at least part of a gear. Particularly, compared with the driving element in the form of a gear that is embodied in the transmission mechanism 121 as illustrated in FIG. 7, it can be seen that the driven element 140 herein is not a complete gear. It is preferred that gear teeth can be machined only on a portion of the outer edge of the driven element 140 which is in contact with the driving element of the transmission mechanism 121, when taking the processing complexity and manufacturing cost into account.

The "operating member" in embodiments of the present disclosure can also be regarded as being formed by removing an upper portion of the driven element 140 in the form of a gear and only leaving a lower portion of the driven element 140 shaped into a fork. The driven element 140 may also be regarded as being formed by adding at least partially gear-like structure to the fork-shaped operating member. In other words, the driven element 140 can be formed in such a way that the at least partially gear-like structure and the fork-shaped operating member are integrated into a complete driven element 140. It will be understood that the driven element 140 and the operating member can be two separate components or can be integrally formed into a single component.

Additionally, as mentioned above, when being mounted on the control modular assembly 130 through the opening 148 (FIG. 2b), the operating member will at least partially protrude out of the control modular assembly 130. Thus, when being detachably assembled with the mechanical switch functional platform, the operating member can be placed on a swinging member 161 of the internal functional assembly 160.

On one side surface facing the support structure 136 of the driven element, a shaft 142 is provided which is for example, integrally formed with the driven element 140. The shaft 142 will be received in the aperture 136a of the support structure 136. In this way, the driven element 140 can drive the operating member to rotate in response to the rotation of the driving element of the transmission mechanism 121, such as the driving gear.

As illustrated in FIG. 3, the operating member has a fork shape and is tapered from top to bottom. That is, the portion of the operating member engaged with the driven element 140 is wider than the portion of the operating member away from the driven element. In this way, when the operating member is placed on the swinging member 161 of the internal functional assembly 160, left and right contact arms 144 of the operating member can provide a clamping force, thereby enhancing the force acting on the swinging member 161 by the operating member.

Furthermore, such a tapered configuration of the operating member can also cause side surfaces 146 of the contact arms 144 to slide more smoothly in the internal functional assembly 160, thereby facilitating easier placement of the operating member on the swinging member 161. Alternatively, the two contact arms 144 of the operating member may also be substantially parallel to each other. Regardless of whether the arms 144 of the operating member are tapered or parallel, at least one protrusion provided on at least one of the two contact arms 144 is always in contact with the corresponding one of side arms (164a, 164b) of the swinging member 161, when operating member is placed on the swinging member 161.

In some embodiments, when the operating member is arranged on the swinging member 161, the two contact arms 144 of the operating member simultaneously contact the corresponding one of the side arms 164a, 164b of the swinging member 161. That is, the swinging member 161 is clamped between the two contact arms 144 of the operating member. In this way, the angle, at which the operating member rotates to drive the swinging member 161 so as to change its position, will be reduced. Further, the consumed electric energy can be reduced, and thus, for example, the lifetime of the battery 131 can be prolonged.

In some embodiments, on opposite inner surfaces of the two contact arms 144, for example, protrusions 145a to 145d are integrally formed. When the operating member moves in response to the operation of the motor 123, the swinging member 161 may be caused to move within a certain range through the direct contact between the protrusions 145a to 145d and the swinging member 161 of the internal functional assembly 160. The protrusions 145a to 145d are disposed, for example, close to the lower end portions of the contact arms 144, for example, as illustrated in FIG. 3. In an exemplary embodiment, the protrusions 145a and 145d are protruded out of the lowermost end of the contact arms 144, and the other two protrusions 145b and 145c are respectively protruded out of the corresponding contact arms 144 at a distance from the protrusions 145a and 145d.

Although four protrusions are specifically illustrated in the drawings, the number of protrusions can be changed. For example, only two protrusions 145a and 145d at the lowermost are provided on the corresponding contact arms 144. As another example, more than two protrusions are provided on each contact arm.

Hollow portions 143 in the respective contact arms 144 are also illustrated in FIG. 3. The hollow portions 143 can be formed by removing a portion of the contact arms 144 in any suitable manner. The formation of the hollow portions 143 improves the elasticity and movement freedom of the contact arms 144, thereby further facilitating the easy placement of the operating member on the swinging member 161. As an example, as illustrated in FIG. 7, when the operating member is arranged on the swinging member 161, a space 149 can be provided between the operating member and the swinging member, further increasing the movement freedom of the driven element 140

In the case where both the driving element and the driven element of the transmission mechanism 121 are gears, such as illustrated in FIG. 7, the driven element 140 as the driven wheel has a larger diameter than the driving wheel coupled to the output shaft 122. Alternatively, the driving wheel has the same diameter as the driven wheel. As an example, in the case where the driving wheel and the driven wheel are meshed with each other as illustrated in FIG. 7, the number of teeth of the driving wheel is less than that of the driven wheel, so that the rotational speed of the driven wheel is lower than that of the driving wheel. In this way, the transmission mechanism 121 constituted by the two gears operates more smoothly.

Figure 4:
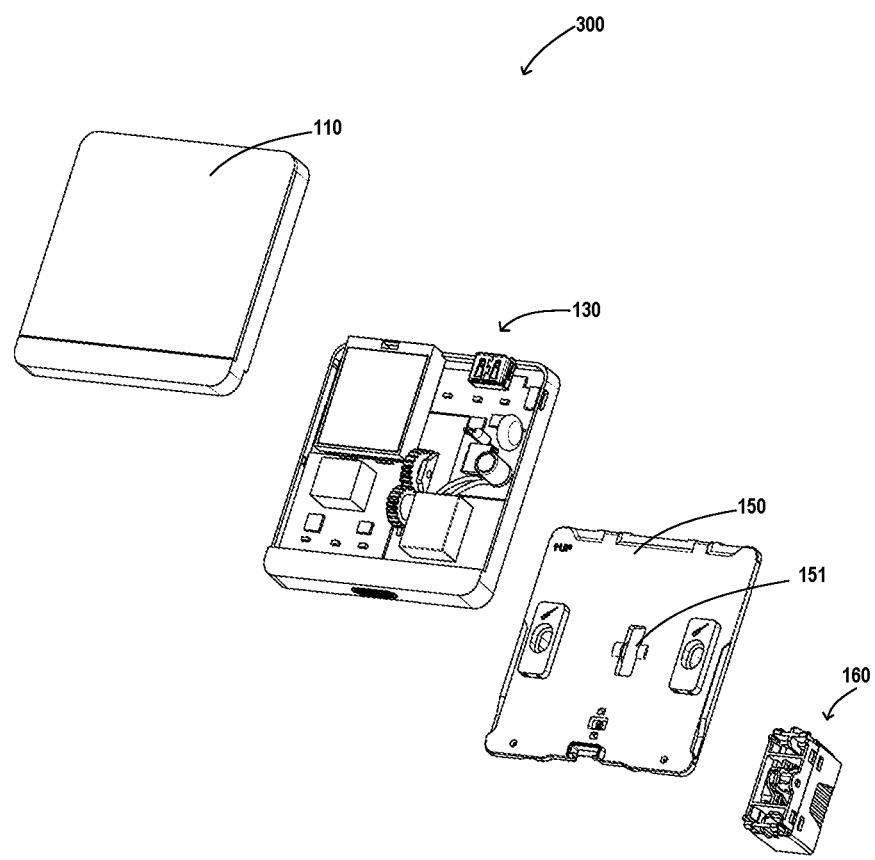
FIG. 4 illustrates an exploded view of a switch including a modular panel assembly and an internal functional assembly according to an exemplary embodiment of the present disclosure.

Further, in the case where both the driving element and the driven element of the transmission mechanism 121 are gears (as described above, the gear coupled to the output shaft 122 serves as the driving wheel and the driven element 140 serves as the driven wheel), the driving wheel and the driven wheel can be arranged in the left-right or horizontal direction, for example, as illustrated in FIGS. 1, 4, and 7. The tops of the two gears are at the same level, so that the vertical space occupied by the transmission mechanism 121 can be minimized, thus achieving miniaturization of the switch. Alternatively, the driving wheel and the driven wheel can be arranged in the up and down or vertical direction, so that the lateral or horizontal space occupied by the transmission mechanism 121 can be minimized, thereby achieving miniaturization of the switch. In this way, users will be able to select the switch according to his or her specific needs.

Alternatively, it is contemplated that the driven element 140 may be in the form of a rack. In this case, the upper portion of the partial gear as illustrated in FIG. 3 is replaced by a straight rack. The operating member can be provided on a side of the driven element 140 without teeth in any appropriate manner, and its rotation axis is also on this side. In this case, the driving wheel of the transmission mechanism 121 is disposed on the upper surface of the rack and meshed with this upper surface. Likewise, the teeth can be machined only in a portion of the rack which is in contact with the driving wheel of the transmission mechanism 121, when taking the processing complexity and manufacturing cost into account. In this case, the support structure 136 for supporting the driven element 140 can be omitted.

In addition, the transmission pair can be configured in such a way, for example, that the driving element of the transmission mechanism 121 is a gear and the driven element (the driven element 140) of the transmission mechanism 121 is in the form as illustrated in FIG. 3 or in the form of the rack or other forms suitable for forming a linkage relationship with the driving element, depending on the user's requirements. These possible arrangements are within the scope of the present disclosure without departing from the general concept of embodiments of the present disclosure.

It can be understood that, either by the meshing between the driving wheel and the driven wheel or by the meshing between the driving wheel and the straight rack, the resulting linkage of transmission pair is able to provide a progressive or gradual control for the switch 300 and thus for the loads (such as a lighting device, an air conditioning equipment, and the like) under control of the switch 300. This is superior to a mechanical switch, such as a rocker switch.

Specifically, in the case of the rocker switch, the rocker panel assembly can only be switched between two positions, i.e., an open position which corresponds to a circuit-on state for turning on the load, for example illuminating devices, and a closed position which corresponds to a circuit-off state for turning off the illuminating devices. However, the progressive control executed in a given range, within which the transmission pair is meshed, also provides a current adjustment state for adjusting the circuit to which the switch is coupled. In this way, the intensity of the illuminating devices can be adjusted, rather than just switching between the tuning on and turning off states.

As an example, when a circuit for adjusting light intensity is arranged in the internal functional assembly 160 assembled together with the modular panel assembly 100, the user will experience the progressive or gradual changes in light intensity by means of the progressive control in the range within which the transmission pair is meshed. In this way, a more intelligent operation of the switch 300 can be achieved by manipulating the modular panel assembly 100.

As an alternative embodiment, instead of the transmission mechanism 121 described above, the fork-shaped operating member can be fixedly and directly connected to the output shaft 122 of the motor 123. In this case, the operating member is coupled with the output shaft 122 to obtain power from the motor 123. With the obtained power, the change in positions of the swinging member 161 is controlled by the interaction of the operating member and the swinging member 161 in the internal functional assembly 160 of the switch 300 Thus, a circuit of the switch 300 and in turn its operating state will be turned on and off accordingly. The contact mode, the interaction relationship, and the like between the operating member and the swinging member 161 of the internal functional assembly 160 can be understood from the above embodiments where the transmission mechanism 121 are constituted by the transmission pair (a combination of two gears, or a combination of a gear and a rack) and will be not described in detail here.

In order to avoid cluttering the view due to drawing too many components, only one transmission pair, i.e., a combination of a motor 123 and a transmission mechanism 121, is depicted in FIGS. 1, 2a, 4 of embodiments of the present disclosure. However, the number of transmission pairs can vary based on the function to be implemented by the switch, for example two, three or more transmission pairs can be provided in the control modular assembly 130 according to its internal available volume. Since one transmission pair is adapted to one swinging member 161 of the internal functional assembly 160, the number of the swinging member 161 that interacts with the driven element 140 of the transmission pair can be two, three or more accordingly. Similarly, the number of motor (and other related components) for driving the transmission pair of the transmission mechanism 121 through the output shaft can also be two, three or more accordingly.

In this way, it is possible to simultaneously implement a plurality of functions in one switch 300. As an example, the illumination devices mounted at different positions can be controlled by only one switch 300. As another example, adjustment of temperature, wind speed, and operating state (cooling, heating, dehumidification, etc.) of an air conditioner can be realized by only one switch 300. Thus, the user only needs to purchase a small number of switches 300 for obtaining more functions conveniently and efficiently.

Although a combination of a plurality of transmission mechanisms 121 and a plurality of motors 123 as described above can be contemplated, it is preferred to provide a combination of one transmission 121 and one motor (FIG. 1, FIG. 4), since the internal space of the assembly 130 is limited.

Referring to FIG. 1, the battery 131 can be any type suitable for being installed into control modular assembly 130 and sized to minimize the overall size of control modular assembly 130. In addition, a charging interface 132 is formed on the frame of the control modular assembly 130. When the battery 131 is low in energy and needs to be charged, the battery 131 can be charged through the charging interface 132, for example, through connection with an external power source (not illustrated). The connection to the external power source can be realized using known means such as a USB interface, a plug, and the like.

In addition, a button 134 may be formed on the frame of the control modular assembly 130. The panel 110 may be detached from the control modular assembly 130 by, for example, pressing the button 134, thereby removing the panel 110, for cleaning or replacement.

The position of the charging interface 132 and the button 134 in the control modular assembly 130 is not limited to that as illustrated in FIG. 1. For example, it may be contemplated that the charging interface 132 and/or the button 134 are arranged at a position with less concern. Thereby the appearance of the product may be formed according to the user's preference.

Alternatively, in particular in the case where a plurality of transmission mechanisms 121 need to be provided in the limited space of the same control modular assembly 130, the required electrical energy may be not provided by the internal battery. In contrast, the electrical energy may be provided via the switch 300 itself, in particular through internal functional assembly 160 in the switch 300.

It can also be seen from FIG. 1 that shoulders 112 and 135 are formed respectively on the frames of the panel 110 and of the control modular assembly 130. When the panel 110 is assembled with the control modular assembly 130 to form the modular panel assembly 100, the shoulders 112 and 135 abut against with each other such that a seamless mounting is formed between the panel 110 and the control modular assembly 130. Alternatively or additionally, the seamless mounting can also be achieved using other known connection structures and means.

The control unit integrates intelligent functions such as information collection, calculation, and control operations. In addition to components (e.g., capacitors, resistors, etc.) known in the art necessary to implement circuit control, the control unit may also comprise a signal receiving sensor disposed on the PCBA 133. The signal sensor comprises one or more sensors of a plurality of types for facilitating the switch 300 (FIGS. 4, 7) comprising the modular panel assembly 100 to perform a variety of beneficial functions. The one or more sensors comprise, but are not limited to, a brightness sensor, an infrared sensor, a microwave sensor, a temperature and humidity sensor, a gas sensor, a touch sensor, a digital password/fingerprint recognition sensor, a voice recognition sensor, a camera, and/or a sound sensor.

The signal receiving sensor can also be disposed externally and independently of the control modular assembly 130. In the case where the signal receiving sensor is disposed outside of the control modular assembly 130, the signal receiving sensor can be placed adjacent to the switch 300. This is beneficial especially for the case where the user activates the switch 300 by touching panel 110, since the user can feel the controlling of the operating state of switch 300 in a close distance. In this case, the panel 110 is arranged to be coupled to the control unit of the control modular assembly 130 and is operable to input signals for controlling the motor and thus controlling the switch 300, for example, by the user's touching on the panel 110.

In the case where the signal receiving sensor is placed outside of the control modular assembly 130, the signal receiving sensor can also be disposed far away from the switch 300. For example, the switch 300 is installed in the room, and the signal receiving sensor is installed outside the room, such as at the doorway. In this way, when the user approaches the door of the room, the user can control the operation state of the switch 300 and thus control the load of the switch 300 (such as a lighting device, an air conditioning equipment, and the like), by blocking the light near the signal receiving sensor, or by making a sound which is to be received by the signal receiving sensor.

In the one or more sensors: the brightness sensor is used to detect a brightness value of an external environment in which the switch 300 is used, and the detected brightness value is transmitted to the PCBA 133 or the motor controller for further processing; the infrared sensor is for detecting infrared rays in the external environment, and the obtained infrared detection result is transmitted to the PCBA 133 or the motor controller for further processing; the microwave sensor is configured to transmit a microwave signal to the external environment through a transmitting antenna, and receive the microwave signal returned by the measured object through a receiving antenna, and the received microwave signal is converted into an electrical signal and then transmitted to the PCBA 133 or the motor controller for further processing; the temperature and humidity sensor is used to detect the temperature and humidity of the external environment, and the obtained detection result is transmitted to the PCBA 133 or the motor controller for further processing; the gas sensor is used for detecting various gas concentration data in the external environment, and the detected result is transmitted to the PCBA 133 or the motor controller for further processing; the camera is used to capture image signal in the external environment and the obtained image signal is transmitted to PCBA 133 or the motor controller for further processing; the acoustic sensor is used to collect a sound signal of the external environment, and the obtained sound signal is transmitted to PCBA 133 or motor controller for further processing.

In addition, the motor control modular 130 also comprises a motor controller. Like the signal receiving sensor, the motor controller can also be provided on the PCBA 133 or separate from the PCBA 133.

In general, the signal receiving sensor and the motor controller cooperate with each other, wherein the signal receiving sensor is used to receive signal from the user, and the motor controller is used to process the signal received by the signal receiving sensor and generate another signal. The motor controller uses said another signal to control the startup, running and stall of the motor 123.

Herein, the operation of the motor 123 at least comprises the following states: a state in which the motor 123 operates in a first direction such that the output shaft 122 rotates, for example, in a clockwise direction; a state in which the motor 123 operates in a second direction opposite to the first direction such that the output shaft 122 rotates, for example, in a counterclockwise direction; and a state in which the rotational speed of the motor 123 can be changed at a constant rate or kept constant during operation in the first direction and/or the second direction, thereby causing the rotational speed of the output shaft 122 to change uniformly or constantly correspondingly.

For the case where only the operating member is coupled to the output shaft 122 of the motor, any motion state of the output shaft 122 will cause the operating member to undergo a corresponding motion state. For example, if the output shaft 122 rotates clockwise and counterclockwise at a constant speed respectively, the operating member also rotates clockwise and counterclockwise respectively. The rotation angle of the operating member within a given range of motion is determined by the motor 123.

In the case where the transmission mechanism 121 is constituted by a set of gears (driving wheel, driven wheel), any motion state of the output shaft 122 will enable the driving wheel to undergo a corresponding motion state, thereby causing a driven wheel associated with the driving wheel (such as the driven element 140) to experience a corresponding motion state. For example, if the output shaft 122 rotates clockwise and counterclockwise at a constant speed respectively, the driving wheel also rotates clockwise and counterclockwise respectively, and in turn causes the driven wheel to rotate counterclockwise and clockwise respectively within a given range of motion. The rotation angle is also determined by the motor 123.

In the case where the transmission mechanism 121 is constituted by a set of transmission members (a driving element, and the driven element 140 in the form of straight rack), any motion state of the output shaft 122 will cause the driving element (for example, a gear) experiencing a corresponding motion state, which in turn causes the driven element (straight rack) associated with the driving element to undergo a corresponding translational motion. For example, if the output shaft 122 rotates clockwise and counterclockwise at a constant speed respectively, the driving element also rotates clockwise and counterclockwise respectively, which causes the driven elements to respectively translate left and right in a horizontal direction within a given translation range.

Specifically, the signal receiving sensor and the motor controller cooperate in the following manner: by way of example, when the user wishes to change the state of the illumination device (or any other type of load, such as an air conditioner, a purifier, etc.) in the room, such as turning on, turning off the illumination device, or adjusting the light intensity of the illumination device, the user can touch the panel 110 of the switch 300, or operate a separate remote controller, or operate a mobile phone to send a signal via a Bluetooth device or a wireless device in the mobile phone. The signal receiving sensor installed in the control modular assembly 130 of the switch 300 or installed outside the switch 300 receives the signal and sends the signal to the motor controller, the motor controller processes the signal and produces another signal, which is used to control ON/OFF of the power supply (such as the battery 131) of the motor 123, thereby controlling the startup, running and stall of the motor 123.

The startup and stall of the motor 123 will cause the associated circuit in the switch 300 to be turned on and off respectively. When the circuit in the switch 300 is closed, the load of the switch 300 is activated, such that for example, the illumination device is turned on, the air conditioner starts up and the like; when the circuit in the switch 300 is opened, the load of the switch 300 is deactivated, such that for example, the illumination device is turned off, the air conditioner is stopped, and the like.

In embodiments of the present disclosure, the signal receiving sensor and the motor controller can be two independent units or an integrated unit to perform the same function.

As an alternative way to improve the user's experiences to the switch product, it is contemplated that a planar pattern can be formed on the upper surface 111 (FIG. 1) of the panel 110. The upper surface 111 is the outermost surface of the switch when the switch 300 is mounted, for example, on a wall. The planar pattern can be, for example, any pattern customized by a user to enrich the appearance of the product, and is preferably a pattern capable of displaying a switching function, such as light intensity, a magnitude of wind speed, or the like. For example, the pattern can be displayed by LEDs. As a further example, the upper surface 111 can be a textured surface capable of providing a tactile sensation. This feature makes the type of switch products more abundant, thereby providing consumers with more purchase options.

For the sake of brevity, further details, such as transformers involved in the control modular assembly 130 and the like, are not described herein, as those skilled in the art will envisage the components and their functions essential to realize the control function of control modular assembly 130.

FIGS. 2a and 2b respectively illustrate the front and back sides of the modular panel assembly 100 when the panel 110 and the control modular assembly 130 are assembled together. When being assembled, the back side of the modular panel assembly 100 illustrated in FIG. 2a will face the base plate 150 of the mechanical switch functional platform. A recess 138 is formed in the back side for receiving at least a portion of the base plate 150. Since the manner of engagement between the modular panel assembly 100 and the base plate 150 of the mechanical switch functional platform is not an important point for embodiments of the present disclosure, it will not be described again. Any manner suitable for joining the modular panel assembly 100 to the base plate 150 of the mechanical switch functional platform without affecting the overall performance of the switch will be encompassed within the scope of the present disclosure.

FIG. 4 schematically illustrates four main components of the switch 300 in an exploded view: the panel 110 and the control modular assembly 130 for being assembled as the modular panel assembly 100, and a base plate 150 and internal functional assembly 160 for being assembled as the mechanical switch functional platform. The internal functional assembly 160 can be bonded to the base plate 150 by being inserted into the through aperture 151 formed in the base plate. As an example, the through aperture 151 is formed at the center of the base plate 150.

Figure 5A:
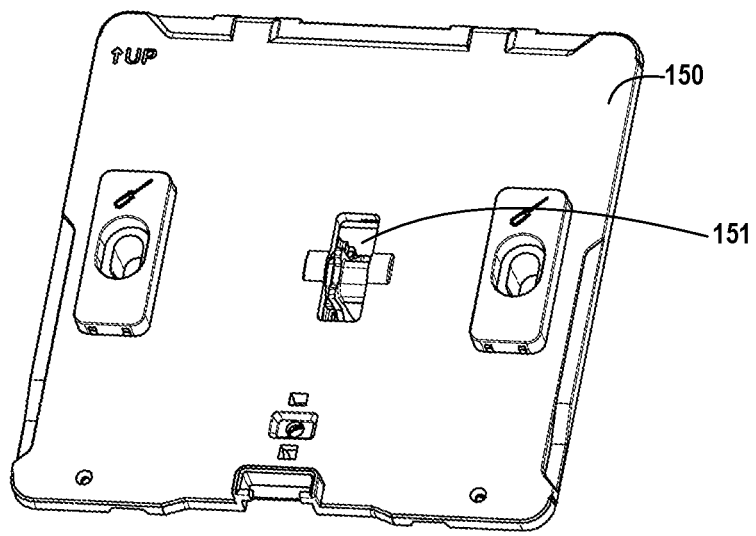
FIGS. 5a and 5b respectively illustrate front and back sides of a mechanical switch functional platform composed of a base plate and an internal functional assembly according to an exemplary embodiment of the present disclosure.
Figure 5B:
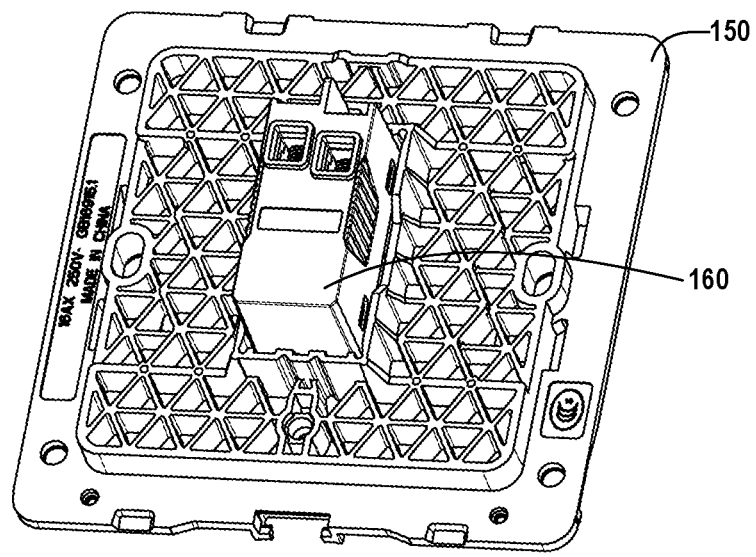

FIGS. 5a and 5b respectively illustrate front and back sides of a mechanical switch functional platform consisting of the base plate 150 and the internal functional assembly 160. When the internal functional assembly 160 is inserted into the through aperture 151 of the base plate 150, it can be seen from FIG. 5a that the internal functional assembly 160 does not protrude beyond the base plate 150, and the lower portion of the internal functional assembly 160 as illustrated in FIG. 5b protrudes out of the base plate 150. In this way, the mechanical switch functional platform and thus the entire switch 300 can be detachably mounted in the wall by embedding the lower part of the internal functional assembly 160 protruded outside, for example, in the wall.

Figure 6:
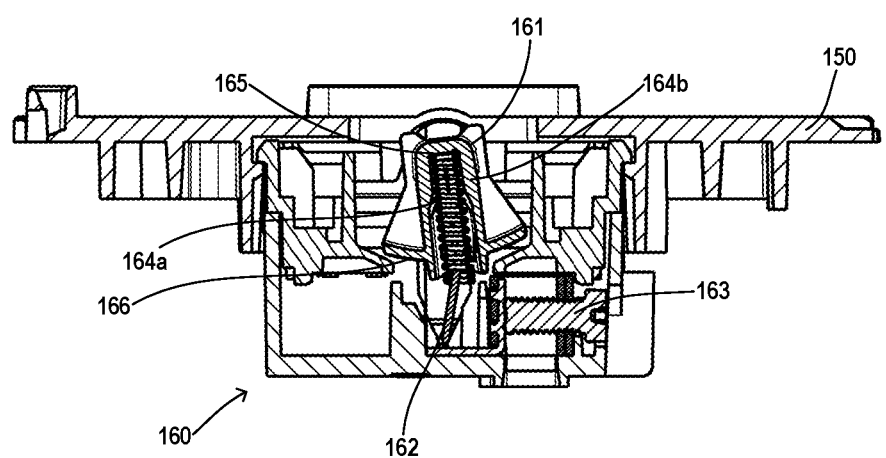
FIG. 6 illustrates a cross-sectional view of a mechanical switch functional platform according to an exemplary embodiment of the present disclosure.

FIG. 6 illustrates an exemplary internal functional assembly 160 in more detail. As mentioned above, the operating member passes through the opening 148 and through the through aperture 151 in the base plate 150 and detachably engaged with the internal functional assembly 160 of the switch.

As described in FIG. 6, the internal functional assembly 160 comprises a swinging member 161, a contact bar 162 and a spring 165. When the operating member is mounted to the swinging member 161, the side arms 164a, 164b of the swinging member contact the fork-like portion of the operating member, such that the swinging member 161 of the internal functional assembly may swing within a certain range in response to the movement of the driven element 140.

The swinging member 161 may move within a given angular range around an axis under the drive of the operating member, and can be held in a given position under the action of the spring 165. The spring 165 is disposed between the swinging member 161 and the contact rod 162 to supply a pressure to the swinging member 161 and the contact rod 162. This pressure moves the swinging member 161 and the contact rod 162 away from each other, thereby maintaining the swinging member 161 in the given position and keeping the contact rod 162 in the corresponding state. The contact rod 162 may be switched between the circuit-on state and the circuit-off state in response to the swinging member 161 swinging within a given range around the axis, thereby achieving the close and open of the circuit of the switch 300. Further, there exists at least one intermediate state between the circuit-on state and the circuit-off state. The at least one intermediate state corresponds to different stages of the progressive control, such as different light intensities of the illumination device.

In the embodiment illustrated in FIG. 6, the swinging member 161 is a hollow structure in a form of blind-aperture. One end of the spring 165 is disposed in the hollow portion of the blind aperture and abuts against the end of the blind aperture to facilitate applying the force as described above. The swinging member 161 is symmetrically provided with two support arms 166 at a position close to its lower end portion. One end of the contact rod 162, for example, is disposed inside the spring 163, and abuts the other end of the spring by a limit part in the middle of the contact rod 162. The contact arms 144 of the operating member can interact with the swinging member 161 only by the clamping force between the protrusions 145a-145d protruding from the contact arms and the side arms 164a and/or 164b of the swinging member 161.

The lower end portion of the contact arms 144 of the operating member may not contact the support arm 166, thereby increasing the movement freedom of the operating member. Alternatively, the lower end portion of the contact arms 144 may abut against the support arm 166. In this case, the movement of the operating member can be transferred to the swinging member 161 through both the contact arms 144 and the support arm 166, thereby controlling the swinging member 161 more precisely.

When the motor 123 is stopped to keep the transmission mechanism 121 stationary, the swinging member 161, the contact rod 162 and the operating member can be stably maintained in any of the circuit-on state, the circuit-off state and the at least one intermediate state due to the action of the spring 165.

It should be noted that the above is merely an exemplary embodiment of the operating member and the swinging member 161. It will be understood by those skilled in the art that the operating member and the swinging member 161 can also adopt any other configurations capable of achieving movement transmission. For example, the operating member and the swinging member 161 can adopt opposite airfoils or even flat structures.

Hereinafter, an exemplary mode of operation of the switch 300 will be described primarily with reference to FIG. 7. The rotating directions $A_1, A_2, B_1, B_2$ are illustrated in FIG. 7, which will be described with respect to an embodiment in which the operating member is in the form of at least partially gear-like structure. FIG. 7 also illustrates substantially horizontal directions $C_1, C_2$, which will be described with respect to an embodiment in which the operating member is presented in the form of a rack. FIG. 7 illustrates the modular panel assembly 100 and the internal functional assembly 160 that have been assembled together. In this assembled state, the base plate 150 is engaged between the control modular assembly 130 and the internal functional assembly 160.

In the embodiment in which the driven element 140 is embodied as at least partially gear-like structure, when the driving element in the form of a gear of the transmission mechanism 121 in this specific embodiment rotates in the counterclockwise direction $A_1$ along with output shaft 122 of the motor 123, the driven element 140 is driven to rotate in a clockwise direction $A_2$ within a given angular range When the driving element of the transmission mechanism 121 rotates in the clockwise direction $B_1$ along with output shaft 122 of the motor 123, the driven element 140 is driven to rotate in a counterclockwise direction $B_2$ within a given angular range.

Obviously, the motor 123 in embodiments of the present disclosure is a motor capable of moving the transmission mechanism 121 in at least two opposite directions. For the sake of brevity, the specific form of the motor will not be described again. The movement of the transmission mechanism 121 in two opposite directions can correspond to, for example, gradually changing states of the light of the illumination device, including from weak to strong and from strong to weak.

By way of example, in an exemplary scenario where the user wishes to turn on the illumination device in the room and then adjust its light intensity, the user first sends a first signal via a remote controller to turn on the illumination device. The information receiving sensor disposed in or outside the switch 300 receives the first signal, and then sends the first signal to the motor controller disposed in or outside the switch 300. The motor controller processes the first signal and generates a second signal, and the generation of the second signal causes the battery 131 to start supplying electrical power to the motor 123, thereby bringing the motor 123 into operating. The motor 123 in turn drives the output shaft 122 to rotate, causing the driving wheel of the transmission mechanism 121 to rotate, for example, in a clockwise direction $B_1$. In this way, the driven element 140 is forced to rotate in the counterclockwise direction $B_2$ for example by a certain angle or a certain pitch and contacts the side arms 164a of the swinging member 161 by the protrusions 145c, 145d on the contact arms 144, and the swinging member 161 is therefore controlled under the rotation of the operating member and reaches the position for closing (switching on) the switch 300, where the illumination device is turned on. At this time, the swinging member 161 is in its first swinging position, the contact rod 162 is in its first position, and the switch 300 is in its circuit-on state. However, the light of the illumination device may be dim at this time.

If the user wishes to adjust the illumination device to be brighter, the user may send a third signal to the information receiving sensor. The information receiving sensor receives the third signal for increasing the intensity of the light and sends the third signal to the motor controller. The motor controller processes the third signal and generates a fourth signal. The fourth signal is such that the motor 123 continues to operate and the driving element of the transmission mechanism 121 and thus the driven element 140 associated with the driving element continue to rotate at an angle along the counterclockwise direction $B_2$ (when the driven element 140 is a gear) or a certain pitch, or translate a distance (when the driven element 140 is a straight rack) or a certain pitch, thereby rotating the swinging member 161 of the internal functional assembly 160. In this way, the state of the swinging member 161 changes from the state where the support arms 166 are in a substantially horizontal position to the state illustrated in the drawing where the support arms 166 on the left side is slightly inclined downward while the support arm 166 on the right side is slightly inclined upward. Thus, the corresponding circuit in the control switch 300 enables the light of the illumination device brighter until it meets the user's requirements.

In this process of progressively adjusting the light intensity, the swinging member 161 will be placed in a plurality of intermediate swinging positions corresponding to different degrees of light intensity respectively. The contact rod 162 will be located in the plurality of intermediate positions corresponding to the plurality of intermediate swinging positions of the swinging member 161 respectively. The switch 300 will correspondingly experience a plurality of intermediate states between the circuit-on state and the circuit-off state.

For example, in an example in which the light intensity of the illumination device has only three adjustment stages, it may be contemplated that the three stages correspond, respectively, to turning on the illumination device (the light intensity is weak), enhancing the light intensity of the illumination device (light intensity is stronger than that when turned on), and turning off the illumination device. Corresponding to the above three stages, the swinging member 161 will be in a first swinging position, an intermediate swinging position and a second swinging position. The contact rod 162 will be located in a first position, an intermediate position and a second position corresponding to the above three stages. The switch 300 will be in a circuit-on state, an intermediate state, and a circuit-off state corresponding to the above three stages.

When the user's requirement for light intensity is satisfied, the information receiving sensor will receive the first stop signal sent by the user through for example the remote controller, Bluetooth, wireless or touch panel 110, etc., and then send the first stop signal to the motor controller. The motor controller processes the first stop signal and generates a second stop signal that will enable the battery 131 to stop supplying electrical power to the motor 123. Then, the motor stops, thereby causing the transmission mechanism 121 to stop moving accordingly. At this time, the swinging member 161 is at an intermediate swinging position corresponding to the intermediate state of the switch 300 corresponding to the current light intensity, and the contact rod 162 is in the intermediate position corresponding to the intermediate state of the switch 300 corresponding to the current light intensity.

In an exemplary scenario where the user wishes to dim the light of the illumination device in the room and ultimately wishes to turn it off, the user first issues a restart signal for adjusting the light intensity of the illumination device by the remote controller or the like. The information receiving sensor receives the restart signal and then sends the restart signal to the motor controller. The motor controller processes the restart signal and generates a fifth signal. The generation of the fifth signal causes the battery 131 to re-power the motor 123, and the motor 123 starts up and drives the output shaft 122 to rotate, thereby the driving element of the transmission mechanism 121 rotating in the counterclockwise direction $A_1$ and thus the driven element 140 rotating in the clockwise direction $A_2$. In this way, the driven element 140 contacts the side arm 164b of swinging member 161 by the protrusions 145a, 145b on the contact arms 144 such that the swinging member 161 is controlled by the rotation of the driven element 140 to rotate in the clockwise direction $A_2$. In this process, the circuit in the switch 300 corresponding to adjusting the light intensity of the illumination device is controlled and then the light of illumination device dimed. During this process, the swinging member 161 will be located in a plurality of intermediate swinging positions corresponding to a plurality of intermediate states associated with the plurality of weakening light intensities of the switch 300 respectively. The contact rod 162 will be located in a plurality of intermediate positions corresponding to a plurality of intermediate states associated with the plurality of weakening light intensities of the switch 300 respectively.

Finally, the user may wish to turn off the illumination device, and then the user may continue to send a sixth signal to the information receiving sensor. The information receiving sensor receives the sixth signal, and then sends the sixth signal to the motor controller. The motor controller possesses the sixth signal and generates a termination signal. The generation of the termination signal enables the motor 123 to drive the driving element of the transmission mechanism 121, thereby driving the driven element 140 to continue to rotate in the clockwise direction $A_2$, and the driven element 140 causes the swinging member 161 to further swing. Thus, the state of the swinging member 161 where the support arm 166 on the left side is slightly inclined downward and the support arm 166 on the right side is slightly inclined upward to is changed into the state where the support arms 166 on both sides are in a substantially horizontal position. At this time, the swinging member 161 is swung to the second swinging position within the given swinging range, and the contact rod 162 reaches the second position that causes the corresponding circuit in the switch 300 to be disconnected by the force of the swinging member 161 for turning off the illumination device. That is, the switch 300 is in its circuit-off state.

In the embodiment in which the driven element 140 is in the form of a straight rack, when the transmission mechanism 121 is embodied as a driving wheel in the form of a gear, as the output shaft 122 of the motor 123 rotates in the counterclockwise direction $A_1$, the driven element 140 in the form of the straight rack is translated in a substantially horizontal direction $C_2$ within a given range, thereby causing the driven element 140, for example, the fork-shaped lower portion illustrated in FIG. 3 to rotate within an angular range. When the driving wheel of the transmission mechanism 121 rotates with output shaft 122 of the motor 123 in the clockwise direction $B_1$, the driven element 140 is driven to translate in a substantially horizontal direction $C_1$ within a given angular range, thereby making the operating member to rotate within an angular range. The manner of mutual cooperation between the driven element 140 and the swinging member 161 and the control of circuit-on and circuit-off of the switch 300 through the linkage between them are substantially the same as the foregoing, and therefore descriptions are omitted here for the sake of brevity.

In the case where only the operating member is coupled to the output shaft 122 of the motor, the control of the switch 300 and its load through the cooperative cooperation between the information receiving sensor and the motor controller as described above can be implemented similarly, and it will not be repeated here for the sake of brevity.

In general, in operation of the switch 300, the operating member or the driven element 140 can move within the given range in response to the operational signal issued by the user and received by the control modular assembly 130 and more particularly by the information receiving sensor, thereby controlling the internal functional assembly 160, and more specifically controlling the change in the swinging position of the swinging member 161. The change in the swinging position of the swinging member 161 causes the contact rod 162 to be correspondingly held in one of its first position, at least one intermediate position and the second position. The switch 300 is correspondingly placed in its circuit-on state, at least one intermediate state, and a circuit-off state, thereby implementing the progressive control.

It is to be noted herein that in the present disclosure, the engagement between the panel 110 and the control modular assembly 130, the engagement between the control modular assembly 130 and the base plate 150, and the detachability between the base plate 150 and the internal functional assembly 160 can realized in any suitable assembly manner known, such as snap-fit, plug-in, screw connection, slide connection, and the like. For example, when the screw connection is used, the corresponding positions of the modular panel assembly 100 and the internal functional assembly 160 are provided with screw apertures. In this event, the installation or disassembly of the modular panel assembly 100 can be completed by means of a screwdriver. Thus, the replacement can be easily and safely used by ordinary users or consumers. By means of the above bonding manner, the switch 300 of the embodiments of the present disclosure provides a switch product with a precise fit assembly method, which presents the advantages of accurate assembly, safety, stability, reliability, and the like.

Thus, when it is desired to change the type or appearance of the modular switch assembly 100, it is only necessary to remove the original modular panel assembly 100 from the base plate 150 and replace it with another modular panel assembly 100 of other type or appearance. There is no need to change the internal functional assembly 160. By coupling the operating member of the modular panel assembly 100 to the internal functional assembly 160 and controlling the operating state/function of the internal functional assembly 160, the user can replace the modular power modular 100 without reaching high voltage. Therefore, the ordinary user can quickly remove and replace the modular panel assembly 100.

Especially for an electronic panel assembly, since the switching of the traditional electronic switch depends on the relay control, the inductive or capacitive loads with high current will be limited. Moreover, easy replacement between different (electronic or mechanical) panels is not possible in presupposition of changing wiring. Therefore, compared with the conventional electronic switch, the electronic panel assembly of embodiments of the present disclosure is characterized in that: embodiments of the present disclosure can realize not only the intelligent experience of the traditional electronic switch, but also the replacement with the mechanical button switch and the mechanical rocker switch on the same mechanical switch functional platform.

In addition, almost every component in the switch can be produced independently. Once any component needs to be replaced or changed, it is only necessary to replace or change the production of the relevant component without changing the production of other components, thus reducing manufacturing costs of the switch.

It should be understood that these exemplary embodiments are provided only to enable those skilled in the art to better understand and the further implement the present disclosure, not intended to limit the scope of the present disclosure in any manner. It should be noted that similar or identical reference numerals may be used in the drawings where similar or identical reference numerals may indicate similar or identical functions. Those skilled in the art will readily recognize that alternative embodiments of the structures and methods described herein may be employed without departing from the principles of the invention described herein.

The terms "comprise" and the like used here should be understood as open terms, i.e., "comprise, but not limited to". The term "based on" means "at least partially based on". The term "one embodiment" indicates "at least one embodiment"; the term "another embodiment" indicates "at least one further embodiment". Relevant definitions of other terms will be provided in the description below.

References to any prior art in this specification are not, and should not be construed as admitting or implying that these prior art constitute common knowledge.

It should be appreciated that the appended claims are only provisional claims, and are examples of possible claims, and are not intended to limit the scope of claims to any future patent application based on the present application. It is possible to add components to or delete components from example claims in the future to further define or re-define the present disclosure.

We claim:

1. A control modular assembly for a switch, wherein the control modular assembly comprises:
    a driving mechanism comprising an output shaft;
    a control unit coupled to the driving mechanism and configured to receive and process a signal for controlling the switch so as to control a movement of the output shaft of the driving mechanism; and
    an operating member coupled to the output shaft;
    wherein the control modular assembly is detachably coupled to an internal functional assembly of the switch, so that the operating member can be driven by the output shaft to move within a given movement range in response to the signal for controlling the switch, such that the operating state of the switch is controlled by controlling the internal functional assembly;
    wherein the control modular assembly further comprises a transmission mechanism, the transmission mechanism comprises a driving element and a driven element engaged with each other, and wherein the driving element is coupled to and driven by the output shaft, the driven element is coupled to the operating member to drive the operating member to move within a given movement range;
    wherein the driving element and the driven element are gears, and wherein the driven element is integrated with the operating member, and wherein a rotation axis of the driven element coincides with a rotation axis of the operating member; and
    wherein the operating member comprises two contact arms, the two contact arms are provided with at least one protrusion on opposite inner surfaces.

2. A control modular assembly for a switch, wherein the control modular assembly comprises:
a driving mechanism comprising an output shaft;
a control unit coupled to the driving mechanism and configured to receive and process a signal for controlling the switch so as to control a movement of the output shaft of the driving mechanism; and
an operating member coupled to the output shaft;
wherein the control modular assembly is detachably coupled to an internal functional assembly of the switch, so that the operating member can be driven by the output shaft to move within a given movement range in response to the signal for controlling the switch, such that the operating state of the switch is controlled by controlling the internal functional assembly,
wherein the control modular assembly further comprises a transmission mechanism, the transmission mechanism comprises a driving element and a driven element engaged with each other, and wherein the driving element is coupled to and driven by the output shaft, the driven element is coupled to the operating member to drive the operating member to move within a given movement range, and
wherein the driving element is a gear and the driven element is a rack, and wherein the operating member is arranged on a side of the rack without teeth to enable a translational movement of the driven element to drive the operating member to rotate around a rotation axis within the given movement range.

3. The control modular assembly according to claim 1, wherein the two contact arms incline to each other in a tapered manner so as to provide a clamping force.

4. The control modular assembly according to claim 1, wherein the operating state of the switch comprises a circuit-on state, a circuit-off state and a current adjustment state.

5. The control modular assembly according to claim 1, wherein the driving mechanism is a motor, and wherein the control modular assembly further comprises a power source for supplying power to the motor.

6. The control modular assembly according to claim 5, wherein the power source is a rechargeable battery, and wherein the control modular assembly further comprises a charging port for charging the battery.

7. The control modular assembly according to claim 5, wherein the power source is a power-obtained device for obtaining power from the switch to supply power to the motor.

8. The control modular assembly according to claim 1, wherein the control unit comprises a signal receiving sensor for receiving the signal for controlling the switch.

9. A switch, comprising:
a control modular assembly comprising
a driving mechanism comprising an output shaft;
a control unit coupled to the driving mechanism and configured to receive and process a signal for controlling the switch so as to control a movement of the output shaft of the driving mechanism; and
an operating member coupled to the output shaft;
wherein the control modular assembly is detachably coupled to an internal functional assembly of the switch, so that the operating member can be driven by the output shaft to move within a given movement range in response to the signal for controlling the switch, such that the operating state of the switch is controlled by controlling the internal functional assembly;
wherein the control modular assembly further comprises a transmission mechanism, the transmission mechanism comprises a driving element and a driven element engaged with each other, and wherein the driving element is coupled to and driven by the output shaft, the driven element is coupled to the operating member to drive the operating member to move within a given movement range;
wherein the driving element and the driven element are gears, and wherein the driven element is integrated with the operating member, and wherein a rotation axis of the driven element coincides with a rotation axis of the operating member; and
wherein the operating member comprises two contact arms, the two contact arms are provided with at least one protrusion on opposite inner surfaces; and
an internal functional assembly operable to control an operating state of the switch;
wherein the control modular assembly is detachably coupled to the internal functional assembly of the switch, so that the operating member of the control modular assembly can be driven by the output shaft of the driving mechanism to move within a given movement range in response to the signal for controlling the switch, such that the operating state of the switch is controlled by controlling the internal functional assembly.

10. The switch according to claim 9, further comprises a panel coupled to a control unit of the control modular assembly and operable to input the signal for controlling the switch.

11. The switch according to claim 9, further comprises a base plate coupled to the internal functional assembly and comprising a through aperture, and wherein the operating member passes through the through aperture to be coupled with the internal functional assembly.

12. The switch according to claim 11, wherein the internal functional assembly comprises:
a swinging member arranged to abut against the operating member to be driven by the operating member;
a contact rod adapted to control the operating state of the switch by changing a position; and
a spring arranged between the swinging member and the contact rod and adapted to provide a pressure to the swinging member and the contact rod, thereby adjusting the position of the contact rod in response to a movement of the swinging member.

13. A switch, comprising:
a control modular assembly comprising
a driving mechanism comprising an output shaft;
a control unit coupled to the driving mechanism and configured to receive and process a signal for controlling the switch so as to control a movement of the output shaft of the driving mechanism; and
an operating member coupled to the output shaft;
wherein the control modular assembly is detachably coupled to an internal functional assembly of the switch, so that the operating member can be driven by the output shaft to move within a given movement range in response to the signal for controlling the switch, such that the operating state of the switch is controlled by controlling the internal functional assembly;

wherein the control modular assembly further comprises a transmission mechanism, the transmission mechanism comprises a driving element and a driven element engaged with each other, and wherein the driving element is coupled to and driven by the output shaft, the driven element is coupled to the operating member to drive the operating member to move within a given movement range; and wherein the driving element is a gear and the driven element is a rack, and wherein the operating member is arranged on a side of the rack without teeth to enable a translational movement of the driven element to drive the operating member to rotate around a rotation axis within the given movement range; and an internal functional assembly operable to control an operating state of the switch;

wherein the control modular assembly is detachably coupled to the internal functional assembly of the switch, so that the operating member of the control modular assembly can be driven by the output shaft of the driving mechanism to move within a given movement range in response to the signal for controlling the switch, such that the operating state of the switch is controlled by controlling the internal functional assembly.

* * * * *